No. 679,366. Patented July 30, 1901.
R. R. DARLING.
MOTOR VEHICLE.
(Application filed Jan. 15, 1900.)

(No Model.) 2 Sheets—Sheet 1.

ATTEST.
R. B. Moser
H. E. Mudra

INVENTOR
Rolla R. Darling
By H. V. Fisher
Atty

THE NORRIS PETERS CO., PHOTO-LITHO., WASHINGTON, D. C.

No. 679,366. Patented July 30, 1901.
R. R. DARLING.
MOTOR VEHICLE.
(Application filed Jan. 15, 1900.)
(No Model.) 2 Sheets—Sheet 2.
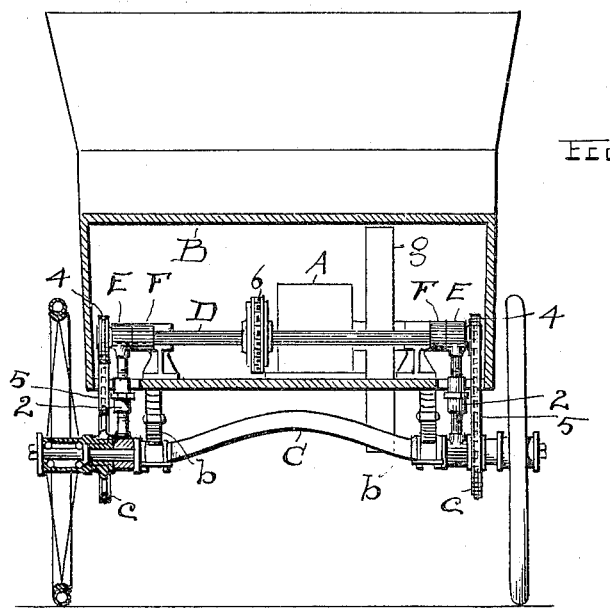
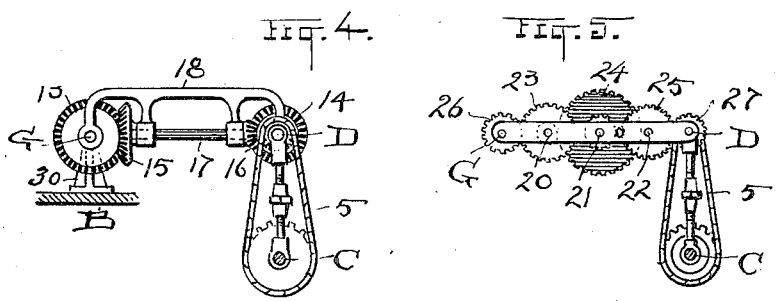
ATTEST
R. B. Moser
H. E. Mudra.
INVENTOR:
Rolla R. Darling
BY W. F. Fisher ATT'Y

UNITED STATES PATENT OFFICE.

ROLLA R. DARLING, OF CLEVELAND, OHIO, ASSIGNOR TO THE BEARDSLEY & HUBBS MANUFACTURING COMPANY, OF MANSFIELD, OHIO.

MOTOR-VEHICLE.

SPECIFICATION forming part of Letters Patent No. 679,366, dated July 30, 1901.

Application filed January 15, 1900. Serial No. 1,462. (No model.)

*To all whom it may concern:*

Be it known that I, ROLLA R. DARLING, a citizen of the United States, residing at Cleveland, in the county of Cuyahoga and State of Ohio, have invented certain new and useful Improvements in Motor-Vehicles; and I do declare that the following is a full, clear, and exact description of the invention, which will enable others skilled in the art to which it appertains to make and use the same.

My invention relates to motor-vehicles; and the invention consists in the construction and combination of parts, substantially as herein shown and described, and particularly pointed out in the claim.

Figure 1:
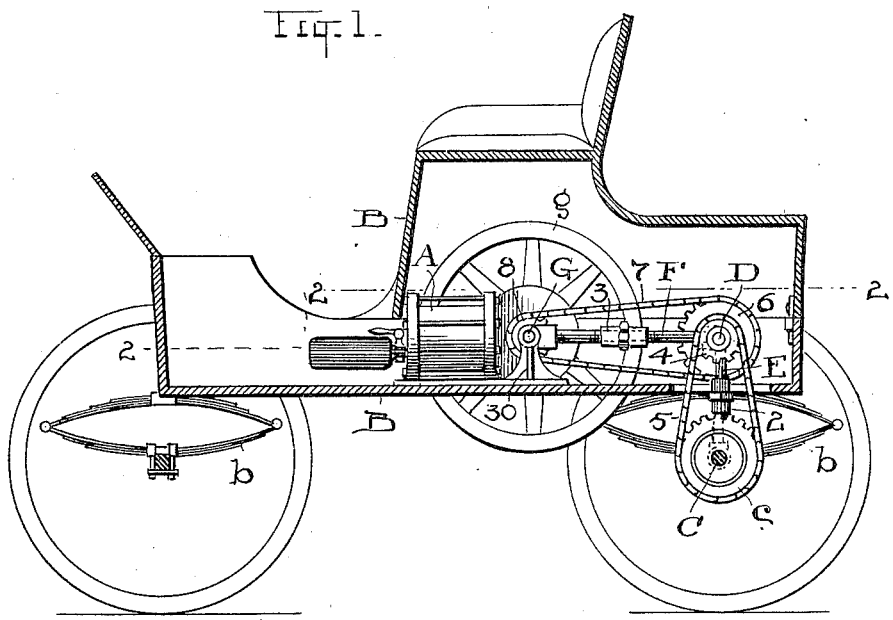
Figure 2:
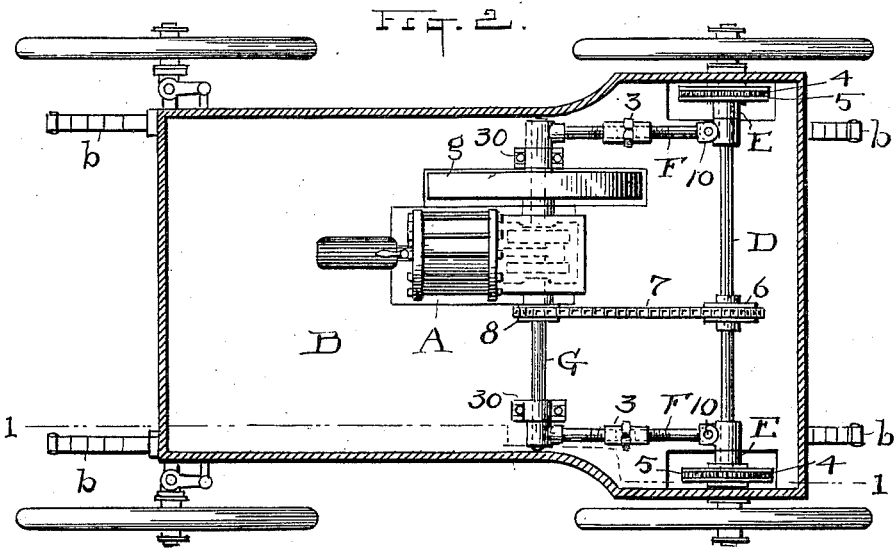

In the accompanying drawings, Figure 1 is a side elevation of a vehicle equipped with my invention, the wheels and near side of the box being sectioned away to disclose the internal and operating relations of the parts. Fig. 2 is a horizontal section and plan on a line corresponding substantially to 2 2, Fig. 1. Fig. 3 is a rear elevation of the vehicle with the rear portion of the box or body sectioned off. Figs. 4 and 5 are modifications of the power-transmitting mechanism, as hereinafter fully described.

One of the important objects of this invention is to provide mechanism for transmitting the power from the engine to the axle which will automatically accommodate itself to the up-and-down play of the body of the vehicle. It will be noticed that I have placed the engine A within the body B and near the middle thereof beneath the seat and that springs $b$ are provided, as usual, between the body and the front and rear axles. This brings the power-transmitting mechanism largely within the body B under cover and out of all view, so that the unsightliness of such mechanism in vehicles of this kind is thereby mostly avoided. Then, again, the said mechanism is not only housed from view but from dust as well, and yet is kept in a large open space for repairs if breakage or other accident should come to it. All this of course requires special features of adaptation and construction, which will now be fully explained.

C represents the rear axle of the vehicle, which may be of any preferred pattern or fashion, and upon it near the wheels are shown sprocket-wheels $c$, Figs. 1 and 3. Over this axle in the body C is the shaft D, supported at its ends by posts E, having a free or rotatable rest or supported on the axle C, and they have a like engagement with the shaft D. These posts are preferably formed in two sections united by a threaded sleeve 2, reversely cut, so as to adjust the post to any desired length. A similarly-constructed connection or connecting-rod F unites the ends of the shaft D with the power-shaft G, Fig. 2, and on which is a balance-wheel $g$ and to which the engine is coupled to impart the power. Adjusting-sleeves 3 unite the middle ends of the rods F, and said rods likewise are free to turn or rotate on their end supports, so that while connection and support are afforded through the rods E and F for the transmitting mechanism after the manner of a rigid frame they yet enable said mechanism to adapt itself to the movements of the body B without in any wise affecting the relationship of the said operating parts. Thus, as seen in Figs. 1, 2, and 3, the shaft D has sprocket-wheels 4 at its ends for the chains 5, which run to the vehicle-axle, while a single and larger sprocket-wheel 6 on shaft D is operated by chain 7 from wheel 8 on the power-shaft. Now having these parts thus associated and the rods E and F adjusted to give the best working tension to the two sets of sprocket-chains 5 and 8 the said chains will hold such tension throughout all the movements of the vehicle and with all the vibrations of the carriage-body, however heavily or lightly it may be loaded, and the differences in position and movements will be compensated by the pivotal connections in parts E and F. In case of the load being more at one side than the other, as frequently occurs, so that one side of the body is down and the other up, the difference is provided for by what, in effect, is a knuckle joint or pivot 10 at the end of the connecting-rod F. Thus a jointed framework is provided which accommodates itself to all the changing conditions met with in the varied uses of the vehicle and which leaves the springs *b* free to perform their accustomed functions.

The carriage-body can be made in two or more sections, so that the part over the machinery may be wholly and easily removed, and thus render the machinery accessible for any required repairs or changes; but the entire power-transmitting mechanism is so simple in all its parts that there is not much room for getting out of repair. In this connection I lay no claim to the engine or source of power as such, and a gas-engine, storage battery, compressed air, or other agency to develop power may be used.

In Figs. 4 and 5 are modifications of the power-transmitting mechanism, in which gear connections and shafts are substituted for the sprocket-chain which goes from shaft D to shaft G, Fig. 2. Thus in Fig. 4 the shafts D and G carry each a miter-gear 13 and 14, respectively, which mesh with gears 15 and 16 on shaft 17, and a connecting and supporting part 18 takes the place, substantially, of the connection F in Fig. 2. Fig. 5 shows a further modification of transmitting mechanism, involving a series of intermediate parallel shafts 20 21 22, with sets of gears 23 24 25, conveying power from gear 26 to gear 27 and thence to the vehicle-axle by sprocket-chain 5, as in Figs. 1 and 2. This construction of modification corresponds in its details to what is shown in my contemporaneous application, Serial No. 569.

Suitable standards 30, fixed permanently to the carriage-body, carry the shaft G, and the rear springs *b* connect the body and the axle C. This gives the supporting jointed frame for the power-transmitting mechanism.

The shaft D is supported directly over axle C and at right angles to said axle and the power-shaft; but a different relationship or position of said parts might be provided without departing from the spirit of the invention.

Usually in motor-vehicles driven by gas-engines the recurring explosions are very sensibly noticeable to the occupants and the vehicle is caused to vibrate more or less by reason of such explosions and as the direct result thereof. Many attempts have been made from time to time to neutralize these effects, but without any special success so far as I am aware or believe. I have found, however, that by employing a pivotally-supported frame to carry the power-transmitting mechanism the shock or jar which the explosion unavoidably produces is so completely absorbed that it is not felt on the rider's seat. This is another very valuable advantage in a loosely-connected frame for carrying the power-transmitting mechanism, as hereinbefore fully described.

What I claim is—

In power-driven vehicles, a fixed axle and carrying-wheels thereon, a driven shaft over said axle, pivoted supports for the shaft resting on the axle and power connections from the ends of the shaft to the hubs of said carrying-wheels, in combination with the body of the vehicle, a drive-shaft supported therein, rigid bracing-links pivoted at their ends on said drive-shaft and said driven shaft, respectively, and power-transmitting connections between said shafts, substantially as described.

Witness my hand to the foregoing specification this 19th day of December, 1899.

ROLLA R. DARLING.

Witnesses:
H. E. MUDRA,
R. B. MOSER.